April 4, 1967 J. G. BENETTI 3,312,002
TOOTH FOR EARTH DIGGING EQUIPMENT
Filed Jan. 13, 1964

INVENTOR.
JOHN G. BENETTI
BY Julian Caplan
ATTORNEY

United States Patent Office 3,312,002
Patented Apr. 4, 1967

3,312,002
TOOTH FOR EARTH DIGGING EQUIPMENT
John G. Benetti, Cupertino, Calif., assignor, by direct and mesne assignments, of one-half to Gerald A. Petersen, Santa Clara, Calif., and one-half to Anita E. Petersen, Saratoga, Calif.
Filed Jan. 13, 1964, Ser. No. 337,406
4 Claims. (Cl. 37—142)

This invention relates to a new and improved tooth for earth-digging equipment such as earth augers, trenching machines, and the like. The tooth is replaceable in that it is held in a toothholder which is integral with or attached to the digging equipment. A single tooth or, preferably, a plurality of replaceable teeth is located on the equipment.

A feature of the present invention, distinguishing this structure from prior teeth, is the fact that the cutting blade is considerably thinner than corresponding portions of teeth previously used in similar installations for similar purposes. The thinness of the cutting edge is advantageous for a number of reasons. One advantage is that the thin edge provides a sharper blade which cuts through the earth more effectively. An additional advantage is the reduction in quantity of material of which the tooth is formed. Still another advantage occurs after the tooth has partially worn in that if the edge is thin it tends to sharpen to a knife-like shape as a result of the abrasion of the soil on the tooth.

Still another feature of the invention is the fact that the cutting portion of the tooth near its juncture with the rearward portion which attached the tooth to the holder is corrugated. The corrugated shape of the portion of the tooth adjoining the root provides strength against fracture which a thin flat blade would not possess.

Another advantage of the corrugated shape of the tooth rearward of its initial cutting edge appears after the tooth has been considerably worn. The corrugated shape is preferably sinusoidal wherein the negative displacement is at a maximum at the center of the tooth. Hence, this depressed zone of the tooth absorbs the greatest wear. As the middle of the tooth wears, the tooth tends to develop a shape having two prongs or tines extending forwardly. The two prongs or tines facilitate the digging action and excavate more effectively.

Other objects of the present invention will become apparent upon reading the following specification and referring to the accompanying drawings in which similar characters of reference represent corresponding parts in each of the several views.

The tooth 11 which is the subject of this invention in its initial shape viewed in plan is, at its forward or working end, substantially rectangular having a transverse thin front edge 12 and thin parallel side edges 13 which merge with the thicker coplanar side edges 14 of the root or proximal portion of the tooth. The thickness of front edge 12 is a distinctive feature of this invention, being considerably thinner than that of prior teeth of this general type such as that shown in Patent No. 2,968,880.

Figure 1:
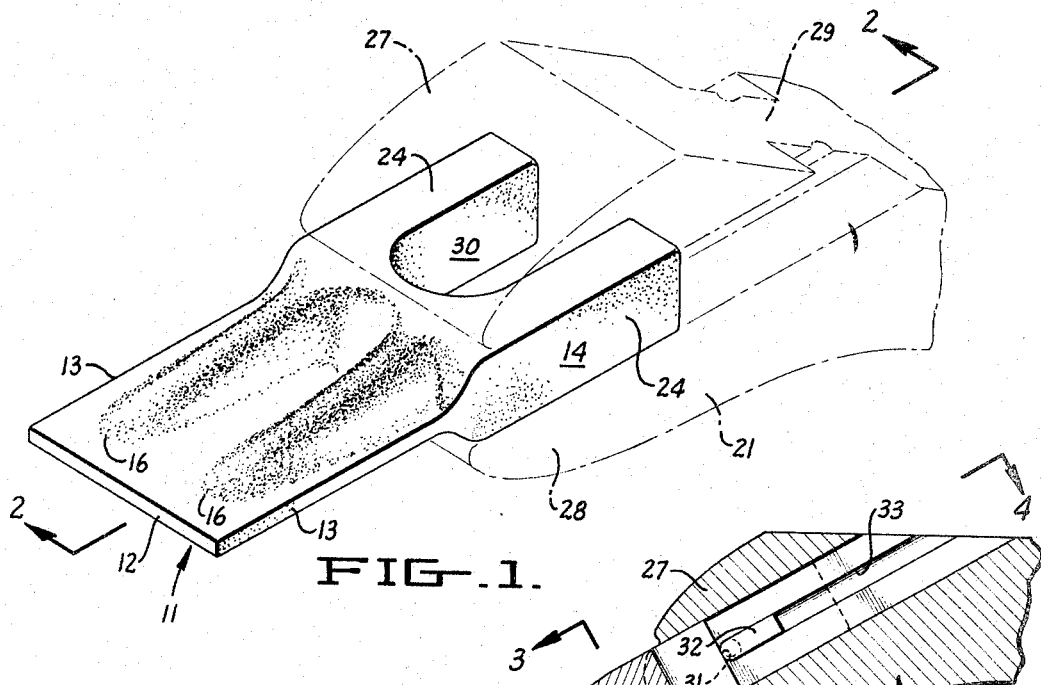
FIG. 1 is a perspective view showing the tooth and also showing in phantom the holder therefor.
Figure 2:
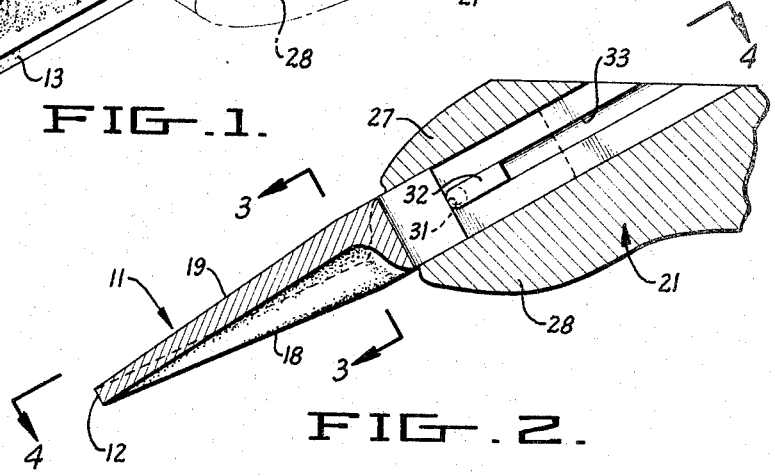
FIG. 2 is a vertical, sectional view taken substantially along the line 2—2 of FIG. 1.
Figure 3:
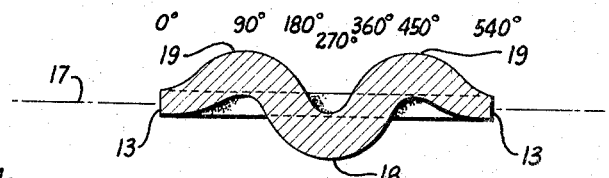
FIG. 3 is a transverse sectional view taken substantially along the line 3—3 of FIG. 2.
Figure 4:
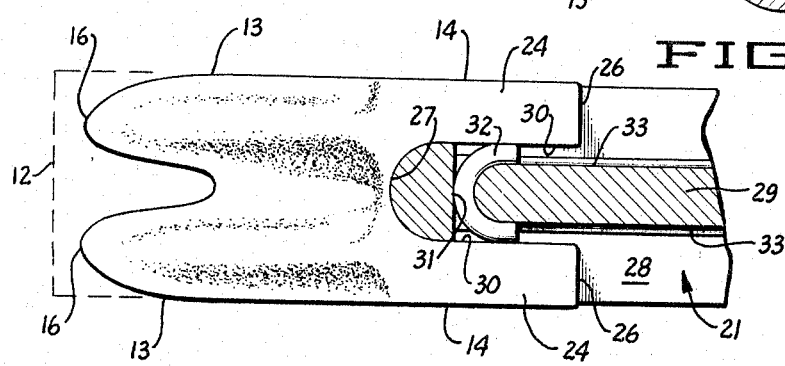
FIG. 4 is a view taken substantially along the line 4—4 of FIG. 2 showing the initial shape of the tooth in dotted lines and showing in solid lines the prongs or tines which tend to develop as the front of the tooth wears.

The thickness of edge 12 as shown in the accompanying drawings is minimal, but the thickness increases only slightly approaching the root of the tooth (see especially FIG. 2). Slightly rearward of the front edge 12, commencing at the points indicated on FIG. 1 by reference numeral 16, the shape of the forward end of the tooth begins to assume a characteristic corrugated configuration which develops gradually until it reaches a full development at the section line 3—3 as best shown in FIG. 3. Directing attention now to FIG. 3 it will be seen that the cross-section of the tooth resembles a sine curve of an arcuate length of 540°. If the lefthand edge of the blade shown in FIG. 3 may be considered 0°, the displacement of the curve from the origin which is indicated by reference line 17 is 0. At 90°, the configuration reaches its maximum positive displacement and crosses the origin reference line at 180° achieving its maximum negative displacement at 270° which is also the longitudinal center line of the tooth. From 270° the tooth reaches origin again at 360°, achieves a second maximum positive displacement at 450° (identical with the displacement at 90°) and then returns to the origin at the righthand edge or 540°. It is a feature of the present invention that the maximum negative displacement indicated by reference numeral 18 in FIG. 3 occurs at the center of the tooth and that the maximum positive displacements 19 occur to either side, and directly behind the points marked 16 in FIGS. 1 and 4.

Immediately behind the section line shown as 3—3 in FIG. 2, the shape of the tooth merges into its proximal or root portion which provides means for attachment of the tooth to its holder 21.

The means by which the tooth 11 is secured to a holder 21, which holder is either a permanent part of or is attached to the earth-digging equipment, is subject to certain variation. A preferred form shown in the accompanying drawings resembles that of Petersen Patent No. 2,968,880 showing a tooth held in a holder by a resilient retaining means. The proximal portion of the tooth has a pair of prongs 24 which are preferably rectangular in cross-section having parallel top and bottom surfaces and blunt transverse ends 26. The thickness of prongs 24 is about equal to the vertically-measured distance between maximum negative and positive displacements 18, 19 and in any event, considerably greater than the thickness of blade 12. The prongs 24 are defined by a slot extending forwardly from the proximal end of the tooth to a rounded, forward end 27 and having substantially vertical edges 30 which are parallel to side edges 14.

Toothholder 21 has top and bottom transverse members 27, 28 interconnected by a vertical web 29 of a thickness to fit between surfaces 30 of prongs 24. The spacing between members 27 and 28 is about equal to the thickness of prongs 24. A hole 31 is formed in web 29 to receive a round, resilient locking member or key 32 of resilient material. Grooves 33 extend in the sidewalls of web 29 rearwardly of hole 31. When tooth 11 is forced into holder 14, the prongs 24 bend key 32 backwardly into grooves 33 and compress the insert 32 between web 29 and surfaces 30 because the cross-section of key 32 is greater than the depth of grooves 33. The compression of insert 32 prevents unintentional displacement of the tooth from its socket. The foregoing means of attachment of a tooth to its support is described in detail in Patent No. 2,968,880. It will be understood that other means may be employed to retain the tooth in its holder.

When the tooth is in initial condition, the thin cutting edge or blade 12 effectively slices through the coil, which may be quite abrasive. The lowermost portion 18 of the tooth normally receives the greatest wear, particularly if the tooth is disposed as shown in FIG. 2 and the relative movement between tooth and soil is horizontally from right to left. As wear occurs, therefore, the shape of the tooth gradually assumes that shown in FIG. 4 with a pair of separate, forwardly pointing prongs whose front ends are indicated by reference numeral 16. Such prongs are effective in digging, particularly in clay-like soils.

After the tooth 11 is completely worn so that prongs 16 have disappeared, it is removed from holder 21 and replaced.

What is claimed is:

1. A replaceable tooth for digging equipment comprising a unitary piece of hard material having a proximal portion formed for attachment to said equipment and a distal portion, said distal portion having a thin cutting edge at its distal end, said cutting edge being rectangular viewed from the distal end of said tooth, the longer sides being as wide as said tooth, and a root at about the juncture of said distal and proximal portions, said root being corrugated in cross-section, the thickness of said distal portion being substantially uniform throughout the amplitude of said corrugations increasing from a position slightly rearward of said cutting edge to a maximum at about said juncture.

2. A tooth according to claim 1 in which said root has approximately a sinusoidal curve shape with maximum negative displacement from the origin at about the center and maximum positive displacements to either side of the center intermediate the center and the outside edges.

3. A replaceable tooth for digging equipment comprising a unitary piece of hard material having a proximal portion formed for attachment to said equipment and a distal portion, said distal portion having a thin cutting edge at its distal end and a root at about the juncture of said distal and proximal portions, said root being corrugated in cross-section, the thickness of said distal portion being substantially uniform throughout, the thickness of said proximal portion being about equal to the difference between the maximum positive and negative displacements of said root.

4. A tooth according to claim 3 in which said tooth has a substantially rectangular outline in plan and said proximal portion is formed with a pair of prongs, each approximately rectangular in cross-section, separated by a slot extending forward from the proximal end of the tooth and passing from top to bottom of said tooth.

References Cited by the Examiner
UNITED STATES PATENTS

| | | | |
|---|---|---|---|
| 2,247,202 | 6/1941 | Ratkowski | 37—142 |
| 2,968,880 | 1/1961 | Petersen | 37—142 |
| 3,021,626 | 2/1962 | Eyolfson | 37—141 |
| 3,103,752 | 9/1963 | Rockwell | 37—141 |

ABRAHAM G. STONE, *Primary Examiner.*

WILLIAM A. SMITH, *Examiner.*